United States Patent
Bent et al.

(10) Patent No.: US 9,626,377 B1
(45) Date of Patent: Apr. 18, 2017

(54) CLUSTER FILE SYSTEM WITH METADATA SERVER FOR CONTROLLING MOVEMENT OF DATA BETWEEN STORAGE TIERS

(71) Applicant: EMC Corporation, Hopkinton, MA (US)

(72) Inventors: John M. Bent, Los Alamos, NM (US); Sorin Faibish, Newton, MA (US); James M. Pedone, Jr., West Boylston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 768 days.

(21) Appl. No.: 13/912,955

(22) Filed: Jun. 7, 2013

(51) Int. Cl.
 *G06F 17/30* (2006.01)

(52) U.S. Cl.
 CPC .. *G06F 17/30203* (2013.01); *G06F 17/30067* (2013.01); *G06F 17/30011* (2013.01)

(58) Field of Classification Search
 CPC ......... G06F 17/30082; G06F 17/30215; G06F 17/30303; G06F 17/30174; G06F 17/30575; G06F 17/30091; G06F 17/30115; G06F 17/30171; G06F 17/30224; G06F 17/30961; G06F 17/3007; G06F 17/30194; G06F 17/30067; G06F 3/0605; G06F 3/067; G06F 3/0631; G06F 3/0647; G06F 17/30203
 USPC ........................................................ 707/827
 See application file for complete search history.

(56) References Cited

U.S. PATENT DOCUMENTS

| | | | | |
|---|---|---|---|---|
| 8,949,208 B1* | 2/2015 | Xu | ........................ | G06F 3/0641 707/661 |
| 2002/0078239 A1* | 6/2002 | Howard | ........... | G06F 17/30094 709/245 |
| 2007/0250594 A1* | 10/2007 | Ohtani | .............. | G06F 17/30233 709/217 |
| 2012/0197845 A1* | 8/2012 | Kim | .................. | G06F 17/30221 707/662 |

(Continued)

OTHER PUBLICATIONS

EMC Corporation, "Introduction to EMC VFCache," White Paper, Feb. 2012, 31 pages.

(Continued)

*Primary Examiner* — Shahid Alam
*Assistant Examiner* — Andalib Lodhi
(74) *Attorney, Agent, or Firm* — Ryan, Mason & Lewis, LLP (57) ABSTRACT

A cluster file system comprises a metadata server coupled to a plurality of object storage servers via a network. The metadata server comprises a controller configured to implement storage tiering control functionality for at least first and second storage tiers comprising respective disjoint subsets of the plurality of object storage servers. The metadata server is thereby configured to control movement of data between the first and second storage tiers. The object storage servers in the first storage tier may be configured to interface with object storage targets of a first type and the object storage servers in the second storage tier may be configured to interface with object storage targets of a second type different than the first type. For example, the object storage targets of the first type may comprise non-volatile electronic storage devices such as flash storage devices, and the object storage targets of the second type may comprise disk storage devices.

20 Claims, 6 Drawing Sheets

(56) References Cited

U.S. PATENT DOCUMENTS

| | | | | |
|---|---|---|---|---|
| 2012/0221822 A1* | 8/2012 | Anderson | ............ | G06F 3/0613 711/165 |
| 2012/0303876 A1* | 11/2012 | Benhase | ............ | G06F 12/0866 711/103 |
| 2012/0310892 A1* | 12/2012 | Dam | ................ | G06F 17/30156 707/659 |
| 2014/0298079 A1* | 10/2014 | Dean | .................. | G06F 12/0246 714/4.5 |
| 2015/0012607 A1* | 1/2015 | Cayton | .............. | H04L 67/1095 709/212 |

OTHER PUBLICATIONS

Cluster File Systems, Inc., "Lustre: A Scalable, High-Performance File System," Nov. 2002, 13 pages.
Feiyi Wang et al., "Understanding Lustre Filesystem Internals," Tech Report: ORNL/TM-2009/117, Apr. 2010, 95 pages.

* cited by examiner

CLUSTER FILE SYSTEM WITH METADATA SERVER FOR CONTROLLING MOVEMENT OF DATA BETWEEN STORAGE TIERS

FIELD

The field relates generally to data storage, and more particularly to parallel file systems and other types of cluster file systems.

BACKGROUND

A cluster file system allows multiple client devices to share access to files over a network. One well-known cluster file system is the Lustre file system. Lustre is a Linux-based high performance cluster file system utilized for computer clusters ranging in size from small workgroup clusters to large-scale, multi-site clusters. Lustre can readily scale to support tens of thousands of clients, petabytes of storage capacity, and hundreds of gigabytes per second of aggregate input-output (IO) throughput. Due to its high performance and scalability, Lustre is utilized in many supercomputers, as well as other complex computing environments, including large enterprise data centers.

In conventional Lustre implementations, it can be difficult to balance the conflicting requirements of storage capacity and IO throughput. IO operations on object storage servers are generally performed directly with back-end storage arrays associated with those servers, and the corresponding storage devices may not be well matched to the current needs of the system. This can lead to situations in which either performance is less than optimal or the costs of implementing the system become excessive.

Accordingly, despite the many advantages of Lustre file systems and other similar cluster file systems, a need remains for additional improvements, particularly with regard to IO operations. For example, further acceleration of IO operations, leading to enhanced system performance relative to conventional arrangements, would be desirable. Additionally or alternatively, an ability to achieve particular levels of performance at lower cost would be advantageous.

SUMMARY

Illustrative embodiments of the present invention provide cluster file systems that implement storage tiering control functionality in metadata servers of the systems, so as to provide significant improvements relative to conventional arrangements. For example, such arrangements allow for transparent inclusion of a flash storage tier in a cluster file system in a manner that avoids the need for any significant changes to clients, object storage servers or applications running on those devices.

In one embodiment, a cluster file system comprises a metadata server coupled to a plurality of object storage servers via a network. The metadata server comprises a controller configured to implement storage tiering control functionality for at least first and second storage tiers comprising respective disjoint subsets of the plurality of object storage servers. The metadata server is thereby configured to control movement of data between the first and second storage tiers.

The object storage servers in the first storage tier may be configured to interface with object storage targets of a first type and the object storage servers in the second storage tier may be configured to interface with object storage targets of a second type different than the first type. For example, the object storage targets of the first type may comprise non-volatile electronic storage devices such as flash storage devices, and the object storage targets of the second type may comprise disk storage devices.

The metadata server in some embodiments is configured to utilize application hint information obtained from one or more applications running on a client of the cluster file system to generate data migration requests. Such data migration request generation may additionally or alternatively be based on policies implemented by a policy engine that may be part of the metadata server controller.

As noted above, illustrative embodiments described herein provide significant improvements relative to conventional arrangements. In some of these embodiments, use of a flash storage tier in conjunction with a disk storage tier allows dynamic balancing of storage capacity and IO throughput requirements in a cluster file system, thereby allowing particular levels of performance to be achieved at a significantly lower cost than would otherwise be possible. Similar improvements are provided using other numbers and types of storage tiers, with migration between the tiers being controlled by one or more metadata servers of the cluster file system.

DETAILED DESCRIPTION

Illustrative embodiments of the present invention will be described herein with reference to exemplary cluster file systems and associated clients, servers, storage arrays and other processing devices. It is to be appreciated, however, that the invention is not restricted to use with the particular illustrative cluster file system and device configurations shown. Accordingly, the term "cluster file system" as used herein is intended to be broadly construed, so as to encompass, for example, distributed file systems, parallel file systems, and other types of file systems implemented using one or more clusters of processing devices.

Figure 1:
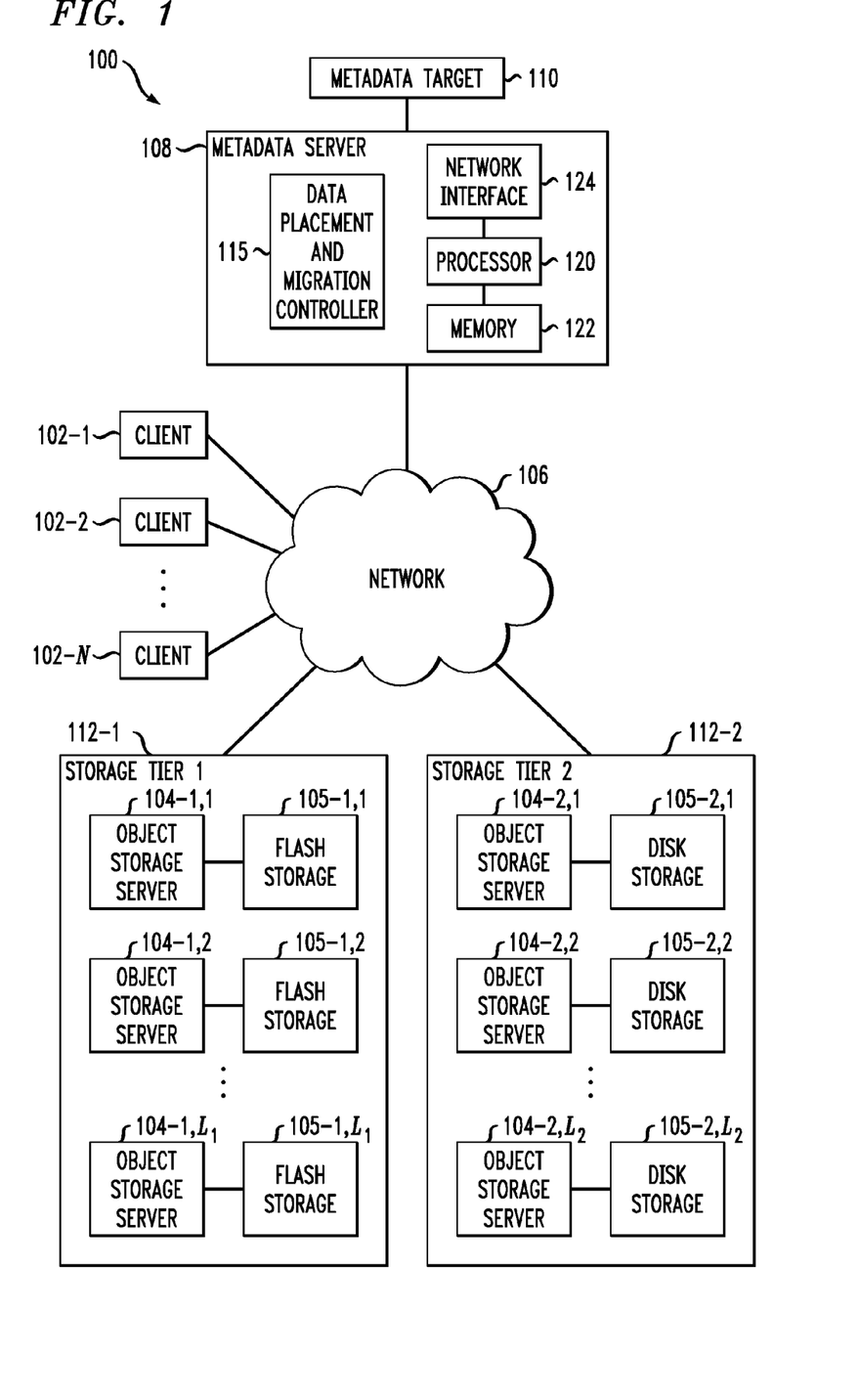
FIG. 1 is a block diagram of a cluster file system having multiple storage tiers and a metadata server configured to control movement of data between the storage tiers in an illustrative embodiment of the invention.

FIG. 1 shows a cluster file system 100 configured in accordance with an illustrative embodiment of the present invention. The cluster file system 100 comprises a plurality of clients 102 and a plurality of object storage servers 104. More particularly, the cluster file system 100 comprises N clients denoted 102-1, 102-2, ... 102-N, and two groups of object storage servers denoted 104-1,1 through 104-1,$L_1$ and 104-2,1 through 104-2,$L_2$. Each of the object storage servers 104 has a corresponding storage device 105 which may comprise a storage array or other type of storage device. Thus, the object storage servers 104-1,1 through 104-1,$L_1$ and 104-2,1 through 104-2,$L_2$ have associated storage devices 105-1,1 through 105-1,$L_1$ and 105-2,1 through 105-2,$L_2$, respectively. The clients 102 and the object storage servers 104 communicate with one another over a network 106. The storage devices 105 are also referred to herein as object storage targets of their corresponding object storage servers 104.

The cluster file system 100 further comprises a metadata server 108 having an associated metadata target 110. The metadata server 108 is configured to communicate with clients 102 and object storage servers 104 over the network 106. For example, the metadata server 108 may receive metadata requests from the clients 102 over the network 106 and transmit responses to those requests back to the clients over the network 106. The metadata server 108 utilizes its metadata target 110 in processing metadata requests received from the clients 102 over the network 106. The metadata target 110 may comprise a storage array or other type of storage device.

Storage arrays utilized in the cluster file system 100 may comprise, for example, storage products such as VNX and Symmetrix VMAX, both commercially available from EMC Corporation of Hopkinton, Mass. A variety of other storage products may be utilized to implement at least a portion of the object storage targets and metadata target of the cluster file system 100.

The network 106 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks. The term "network" as used herein is therefore intended to be broadly construed, so as to encompass a wide variety of different network arrangements, including combinations of multiple networks possibly of different types.

The object storage servers 104 in the present embodiment are arranged into first and second storage tiers 112-1 and 112-2, also denoted as Storage Tier 1 and Storage Tier 2, although it is to be appreciated that more than two storage tiers may be used in other embodiments. As noted above, each of the storage devices 105 may be viewed as being representative of an object storage target of the corresponding one of the object storage servers 104. The first and second storage tiers 112-1 and 112-2 comprise respective disjoint subsets of the object storage servers 104. More particularly, the first storage tier 112-1 comprises object storage servers 104-1,1 through 104-1,$L_1$ and the corresponding storage devices 105-1,1 through 105-1,$L_1$, and the second storage tier 112-2 comprises object storage servers 104-2,1 through 104-2,$L_2$ and the corresponding storage devices 105-2,1 through 105-2,$L_2$.

The different storage tiers 112-1 and 112-2 in this embodiment comprise different types of storage devices 105 having different performance characteristics. As mentioned previously, each of the object storage servers 104 is configured to interface with a corresponding object storage target in the form of a storage device 105 which may comprise a storage array. The object storage servers 104-1,1 through 104-1,$L_1$ in the first storage tier 112-1 are configured to interface with object storage targets of a first type and the object storage servers 104-2,1 through 104-2,$L_2$ in the second storage tier 112-1 are configured to interface with object storage targets of a second type different than the first type. More particularly, in the present embodiment, the object storage targets of the first type comprise respective flash storage devices 105-1,1 through 105-1,$L_1$, and the object storage targets of the second type comprise respective disk storage devices 105-2,1 through 105-2,$L_2$.

The flash storage devices of the first storage tier 112-1 are generally significantly faster in terms of read and write access times than the disk storage devices of the second storage tier 112-2. The flash storage devices are therefore considered "fast" devices in this embodiment relative to the "slow" disk storage devices. Accordingly, the cluster file system 100 may be characterized in the present embodiment as having a "fast" storage tier 112-1 and a "slow" storage tier 112-2, where "fast" and "slow" in this context are relative terms and not intended to denote any particular absolute performance level. These storage tiers comprise respective disjoint subsets of the object storage servers 104 and their associated object storage targets 105. However, numerous alternative tiering arrangements may be used, including three or more tiers each providing a different level of performance. The particular storage devices used in a given storage tier may be varied in other embodiments, and multiple distinct storage device types may be used within a single storage tier.

Also, although only a single object storage target is associated with each object storage server 104 in the FIG. 1 embodiment, other embodiments may associate multiple object storage targets with each object storage server. An example of an arrangement of the latter type will be described below in conjunction with FIG. 2.

The flash storage devices 105-1,1 through 105-1,$L_1$ may be implemented, by way of example, using respective flash Peripheral Component Interconnect Express (PCIe) cards or other types of memory cards installed in a computer or other processing device that implements the corresponding object storage server 104. Numerous alternative arrangements are possible. Also, a variety of other types of non-volatile or volatile memory in any combination may be used to implement at least a portion of the storage devices 105. Examples of alternatives to flash storage devices that may be used as respective object storage targets in other embodiments of the invention include non-volatile memories such as magnetic random access memory (MRAM) and phase change random access memory (PC-RAM).

The flash storage devices of the first storage tier 112-1 generally provide higher performance than the disk storage devices but the disk storage devices of the second storage tier 112-2 generally provide higher capacity at lower cost than the flash storage devices. The exemplary tiering arrangement of FIG. 1 therefore makes it possible to dynamically balance the conflicting requirements of storage capacity and IO throughput, thereby avoiding situations in which either performance is less than optimal or the costs of implementing the system become excessive. Arrangements of this type can provide further acceleration of IO operations in the cluster file system 100, leading to enhanced system performance relative to conventional arrangements, while additionally or alternatively providing an ability to achieve particular levels of performance at lower cost.

In the FIG. 1 embodiment, storage tiering control functionality is implemented in the metadata server 108 in a manner that avoids the need for any significant changes to clients 102, object storage servers 104 or applications running on those devices.

More particularly, in this embodiment the metadata server 108 comprises a data placement and migration controller 115. The data placement and migration controller 115 is configured to implement storage tiering control functionality for the first and second storage tiers 112-1 and 112-2 which as noted above comprise respective disjoint subsets of the object storage servers 104. The metadata server 108 is thereby configured to control movement of data between the storage devices 105 of the first and second storage tiers 112-1 and 112-2. Examples of such movement will be described below in conjunction with the flow diagrams of FIGS. 4, 5 and 6. The data placement and migration controller 115 may be viewed as one possible example of what is more generally referred to herein as a "controller," and numerous alternative controllers having various configurations may be used in a given metadata server in other embodiments.

The metadata server 108 further comprises a processor 120 coupled to a memory 122. The processor 120 may comprise a microprocessor, a microcontroller, an application-specific integrated circuit (ASIC), a field-programmable gate array (FPGA) or other type of processing circuitry, as well as portions or combinations of such circuitry elements. The memory 122 may comprise random access memory (RAM), read-only memory (ROM) or other types of memory, in any combination.

The memory 122 and other memories disclosed herein may be viewed as examples of what are more generally referred to as "computer program products" storing executable computer program code.

Also included in the metadata server 108 is network interface circuitry 124. The network interface circuitry 124 allows the metadata server to communicate over the network 106 with the clients 102 and the object storage servers 104. The network interface circuitry 124 may comprise, for example, one or more conventional transceivers.

The data placement and migration controller 115 of the metadata server 108 may be implemented at least in part in the form of software that is stored in memory 122 and executed by processor 120.

The metadata server 108 comprising processor, memory and network interface components as described above is an example of what is more generally referred to herein as a "processing device." Each of the clients 102 and object storage servers 104 may similarly be implemented as a processing device comprising processor, memory and network interface components.

Although only a single metadata server 108 is shown in the FIG. 1 embodiment, a given cluster file system in other embodiments may comprise multiple metadata servers, each having one or more metadata targets.

The cluster file system 100 may be implemented, by way of example, in the form of a Lustre file system, although use of Lustre is not a requirement of the present invention. Accordingly, servers 104 and 108 need not be configured with Lustre functionality, but may instead represent elements of another type of cluster file system. An example of a Lustre file system configured in accordance with an embodiment of the invention will now be described with reference to FIG. 2.

Figure 2:
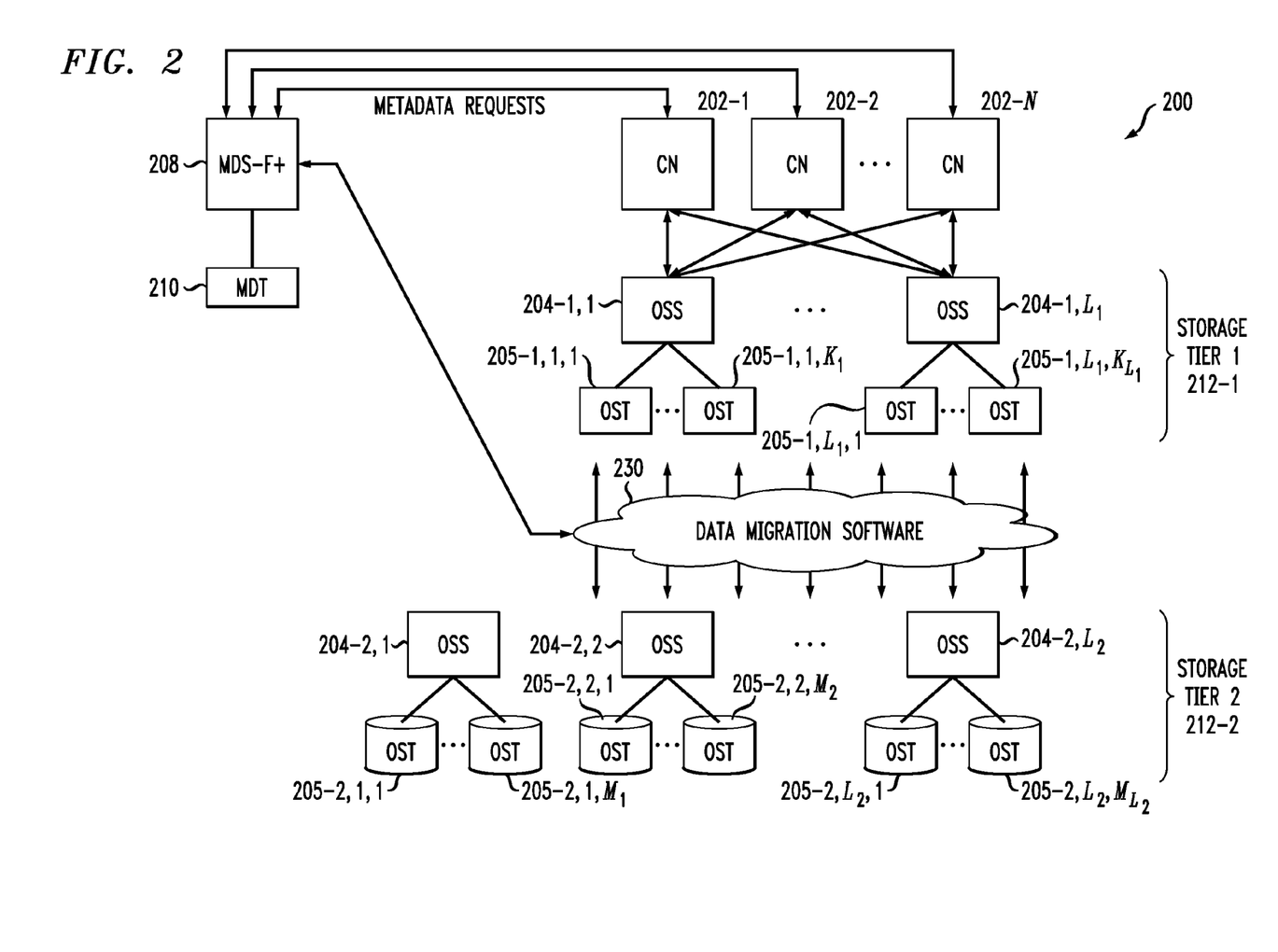
FIG. 2 is a block diagram of another illustrative embodiment of a cluster file system with a metadata server for controlling movement of data between storage tiers.

As illustrated in FIG. 2, a Lustre file system 200 in an embodiment of the invention comprises a plurality of clients 202-1, 202-2, . . . 202-N, a plurality of object storage servers 204, a plurality of object storage targets 205, and a metadata server 208 having a corresponding metadata target 210. The clients 202 are more particularly referred to as compute nodes (CNs) in this embodiment. The object storage servers 204, object storage targets 205, metadata server 208 and metadata target 210 are also denoted in this figure as Lustre OSS, OST, MDS and MDT elements, respectively.

A given OSS 204 exposes multiple OSTs 205 in the present embodiment. Each of the OSTs may comprise one or more storage arrays or other types of storage devices. The total data storage capacity of the Lustre file system 200 is the sum of all the individual data storage capacities represented by the OSTs 205. The clients 202 can concurrently access this collective data storage capacity using data IO requests directed to the OSSs 204 based on metadata obtained from the MDS 208. The IO requests and other similar requests herein may be configured, for example, in accordance with standard portable operating system interface (POSIX) system calls.

The MDS 208 utilizes the MDT 210 to provide metadata services for the Lustre file system 200. The MDT 210 stores file metadata, such as file names, directory structures, and access permissions.

Additional details regarding conventional aspects of Lustre file systems may be found in, for example, Cluster File Systems, Inc., "Lustre: A Scalable, High-Performance File System," November 2002, pp. 1-13, and F. Wang et al., "Understanding Lustre Filesystem Internals," Tech Report ORNL/TM-2009/117, April 2010, pp. 1-95, which are incorporated by reference herein.

As indicated previously, it is difficult in conventional Lustre implementations to balance the conflicting requirements of storage capacity and IO throughput. This can lead to situations in which either performance is less than optimal or the costs of implementing the system become excessive.

In the present embodiment, these and other drawbacks of conventional arrangements are addressed by configuring the metadata server 208 of the Lustre file system 200 to incorporate storage tiering control functionality. As will be described, such arrangements advantageously allow for transparent inclusion of a flash storage tier in a cluster file system in a manner that avoids the need for any significant changes to clients, object storage servers or applications running on those devices. Again, other types and configurations of multiple storage tiers and associated storage devices may be used. Also, multiple metadata servers may be implemented in the system in other embodiments.

The particular storage tiering arrangement implemented in Lustre file system 200 includes first and second storage tiers 212-1 and 212-2, with data migration software 230 being utilized to control movement of data between the tiers. Although shown as separate from the MDS 208, the data migration software 230 is assumed to be implemented at least in part in a controller of the MDS, which may be similar to the data placement and migration controller 115 utilized in the FIG. 1 embodiment. Exemplary features of the data migration software and other functionality associated with a controller of an MDS will be described below in conjunction with the flow diagrams of FIGS. 4, 5 and 6. Other portions of the data migration software 230 are assumed to be implemented in other system components, such as the OSSs of the first and second storage tiers 212-1 and 212-2.

In the first storage tier 212-1, there are $L_1$ OSSs having $K_1, K_2, \ldots K_{L1}$ OSTs, respectively. Thus, for example, OSS 204-1,1 has OSTs denoted 205-1,1,1 through 205-1,1,$K_1$, and OSS 204-1,$L_1$ has OSTs denoted 205-1,$L_1$,1 through 205-1,$L_1$,$K_{L1}$.

In the second storage tier 212-2, there are $L_2$ OSSs having $M_1, M_2, \ldots M_{L2}$ OSTs, respectively. Thus, for example, OSS 204-2,1 has OSTs denoted 205-2,1,1 through 205-2,1,$M_1$, OSS 204-2,2 has OSTs denoted 205-2,2,1 through 205-2,2,$M_2$, and OSS 204-2,$L_2$ has OSTs denoted 205-2,$L_2$,1 through 205-2,$L_2$,$M_{L2}$.

As in the FIG. 1 embodiment, it is assumed that the OSTs of the first storage tier 212-1 are "fast" relative to the "slow" OSTs of the second storage tier 212-2. For example, the OSTs of the first storage tier 212-1 may comprise primarily flash storage devices and the OSTs of the second storage tier 212-2 may comprise primarily disk storage devices. As mentioned previously, the flash storage devices generally provide higher performance than the disk storage devices but the disk storage devices generally provide higher capacity at lower cost than the flash storage devices. Like the FIG. 1 embodiment, the exemplary tiering arrangement of FIG. 2 makes it possible to dynamically balance the conflicting requirements of storage capacity and IO throughput, thereby avoiding situations in which either performance is less than optimal or the costs of implementing the system become excessive. This is achieved in the present embodiment primarily by modification of the MDS 208, and therefore with minimal disruption to other system elements such as clients 102, object storage servers 104 or applications running on those devices. The MDS 208 in the FIG. 2 embodiment is also denoted as an MDS-F+ component as it is configured to support a flash extension of the cluster file system 200 using a flash storage tier as previously described.

It should be noted with regard to the illustrative embodiments of FIGS. 1 and 2 that relatively minor modifications may be made to one or more applications or other system elements or components in order to achieve additional improvements. For example, a job scheduler or other similar component within the system 100 or 200 can also be modified so as to take full advantage of the available storage tiering functionality. Also, some relatively minor modifications may be made to at least a portion of the object storage servers 104 or 204. For example, object storage servers of each of the storage tiers 112 or 212 in the system 100 or 200 may be optimized for use with the corresponding storage device type of their corresponding storage tier.

Figure 3:
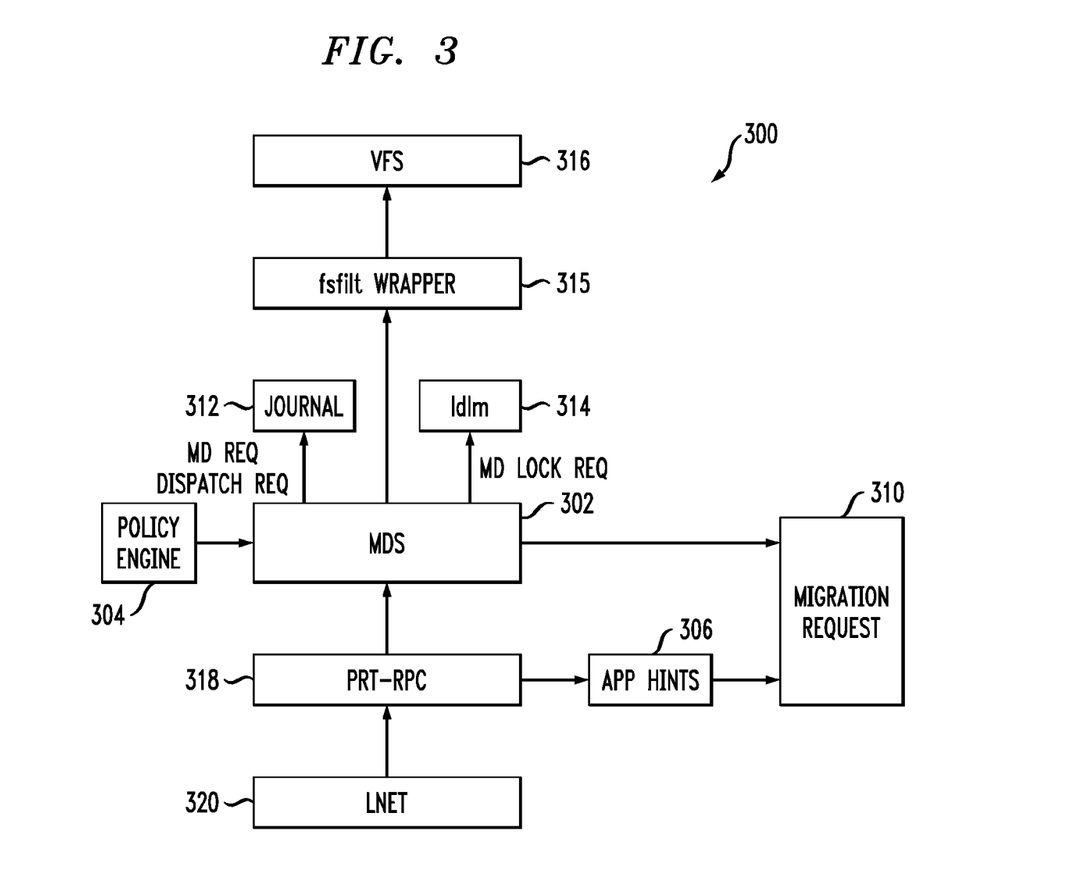
FIG. 3 illustrates a portion of a cluster file system including metadata server components in an illustrative embodiment.

FIG. 3 shows a portion 300 of cluster file system 100 or 200 illustrating one possible implementation of various system components associated with the metadata server 108 or 208. In the system portion 300, core MDS functionality such as request dispatching is illustrated by component 302, and is supplemented in this embodiment by a policy engine 304, an application hints module 306 and a migration request module 310, all of which are assumed to be implemented within the MDS 108 or 208.

Other components of the MDS 108 or 208 illustrated in portion 300 include a journal module 312, a Lustre distributed lock manager (ldlm) module 314, a file system (FS) filter (fsfilt) wrapper 315 and a virtual file system (VFS) interface 316.

As noted above, the core MDS component 302 implements request dispatching functionality in this embodiment, providing information relating to metadata requests to the journal 312 and information relating to metadata lock requests to the ldlm module 314. The core MDS component may also implement other functionality commonly associated with operation of a metadata server in a cluster file system.

Also associated with the MDS 108 or 208 in this embodiment are a number of communication layers including a portal remote procedure call (PRT-RPC) layer 318 and a Lustre network (LNET) layer 320. These layers are utilized to control data movement between the MDS 108 or 208 and other cluster file system components such as clients 102 or 202 and object storage servers 104 or 204. One or more such communication layers are assumed to be part of what is more generally referred to herein as a "remote procedure call interface" of the MDS 108 or 208.

A given data migration request may be generated in the system 100 or 200 based on application hints obtained by module 306 via the PRT-RPC layer 318. For example, a given application running on one of the clients 102 or 202 may provide an indication of a particular type of specialized processing for a certain job, such as "fast" or "slow" processing associated with respective first or second storage tiers. Such information may be utilized by module 306 to generate migration request 310 directing movement of corresponding data between storage tiers of the cluster file system.

In other situations, such as when there are no application hints indicating a particular type of specialized processing for a certain job, the policy engine 304 may determine appropriate tiers to be used for the corresponding data. The corresponding policy decision is conveyed from the policy engine 304 to the core MDS component 302 and utilized to generate the migration request 310. For example, the policy engine 304 may implement a policy that specifies that files having a certain request rate will be kept in a flash storage tier even in the absence of any particular application hints.

Components such as policy engine 304 and application hint module 306 may be implemented in whole or in part as part of a "controller" of the metadata server as that term is broadly used herein.

The particular arrangement of system components illustrated in FIG. 3 is just one possible implementation of portions of the system 100 or 200, and other embodiments may use other metadata server configurations comprising additional or alternative components.

Figure 4:
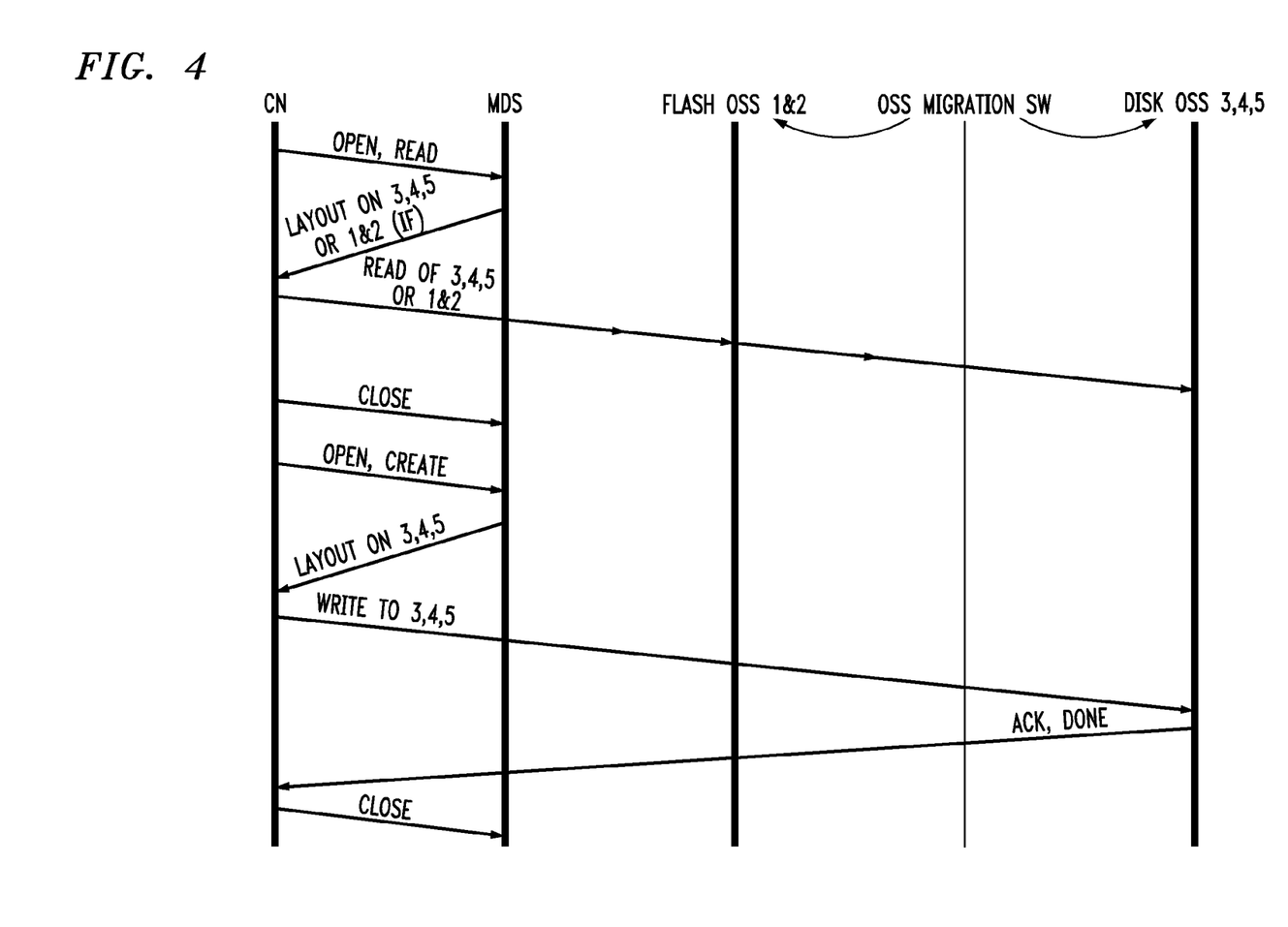
FIGS. 4, 5 and 6 are flow diagrams illustrating exemplary operations of a cluster file system in illustrative embodiments.
Figure 5:
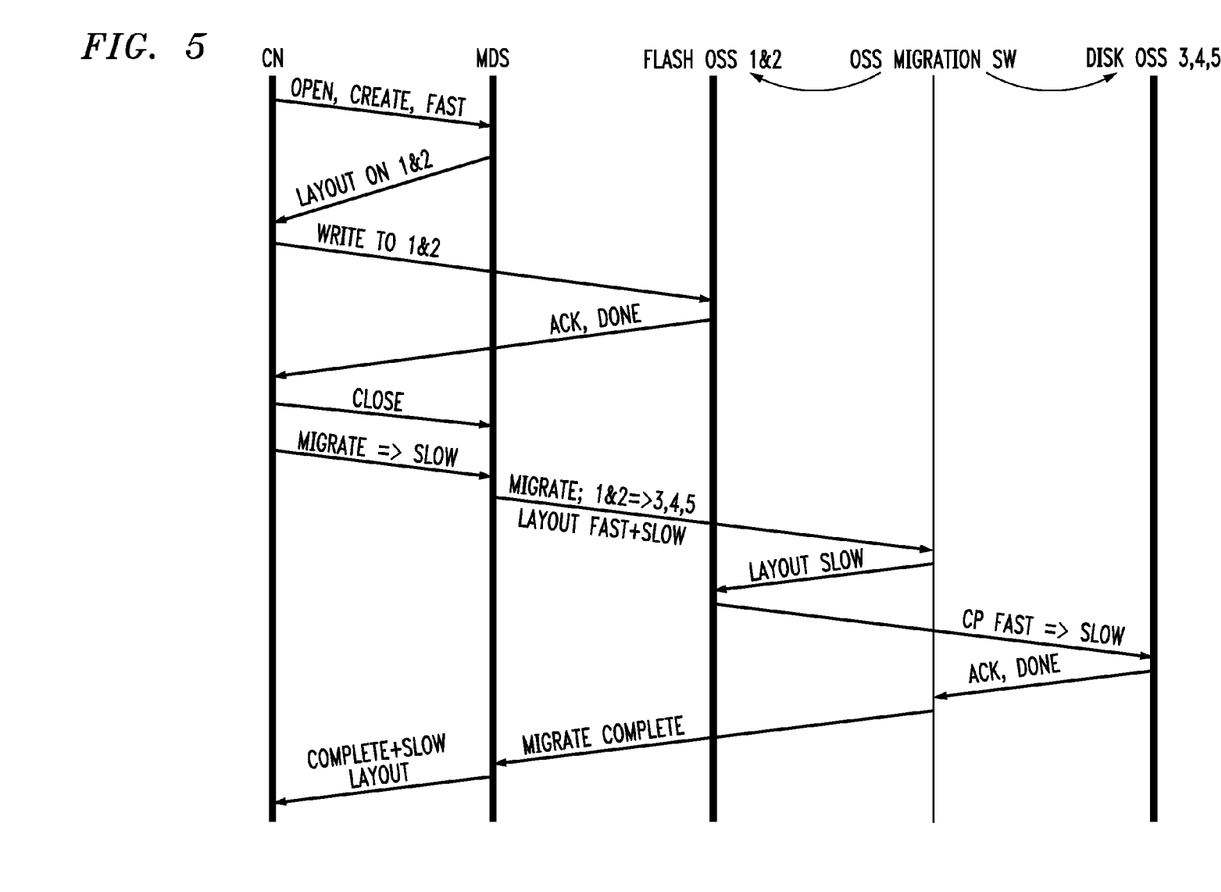
Figure 6:
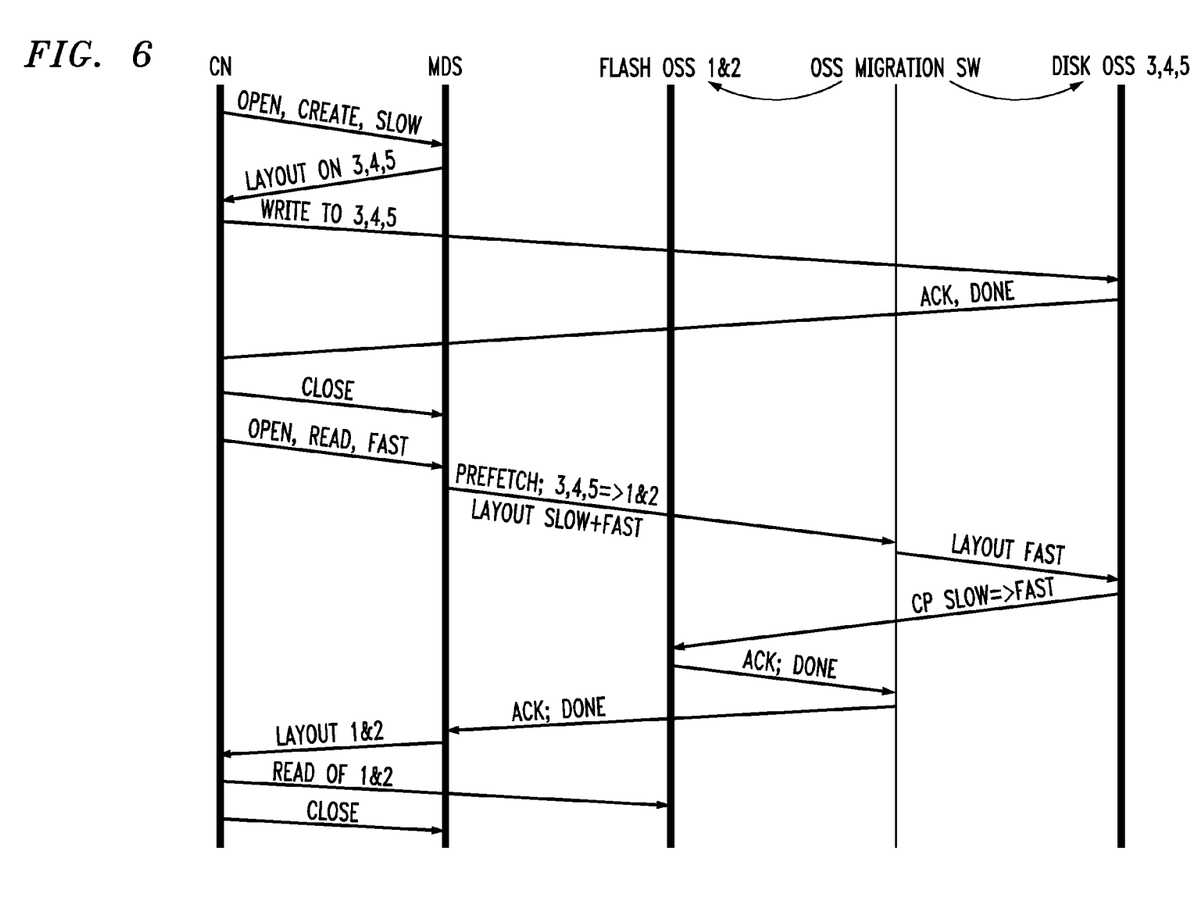

Examples of operations that may be performed in the system 100 or 200 utilizing the metadata server 108 or 208 will now be described in more detail with reference to the flow diagrams of FIGS. 4, 5 and 6. In each of these figures, interactions are shown between system elements including a given client 102 or 202 denoted CN, metadata server 108 or 208 denoted MDS, a flash storage tier 112-1 or 212-1 comprising object storage servers 104 or 204 denoted OSS 1 and OSS 2, and a disk storage tier 112-2 or 212-2 comprising object storage servers 104 or 204 denoted OSS 3, OSS 4 and OSS 5. Migration of data between the storage tiers is carried out using data migration software which is assumed to be provided at least in part by a controller of the MDS, although it is illustrated in FIGS. 4, 5 and 6 as a separate component denoted OSS Migration SW. Portions of the OSS Migration SW are assumed to be implemented in the OSSs of the storage tiers.

In these examples, as in other embodiments described herein, the flash storage tier is also referred to as a "fast" storage tier and the disk storage tier is also referred to as a "slow" storage tier. Again, the terms "fast" and "slow" in this context are relative terms and should not be construed as requiring any particular absolute performance levels.

Referring now more particularly to the flow diagram of FIG. 4, the operations illustrated here include exemplary read and write operations that are performed without any migration of data between storage tiers. The client CN sends an "open, read" request to the MDS which responds with metadata that is assumed to comprise a layout of at least a portion of the flash storage tier comprising OSSs 1 and 2, or a layout of at least a portion of the disk storage tier comprising OSSs 3, 4 and 5, if the requested data resides in one of those tiers. The read operation is then performed by the CN interacting with one or more of the OSSs of the appropriate storage tier using the layout metadata provided by the MDS. Upon completion of the read operation, a "close" request is sent by the CN to the MDS as indicated.

The client CN then sends an "open, create" request to the MDS which responds with metadata that is assumed to comprise a layout of at least a portion of the disk storage tier comprising OSSs 3, 4 and 5. The write operation is then performed by the CN interacting with one or more of the OSSs of the disk storage tier using the layout metadata provided by the MDS. Upon completion of the write operation, an acknowledgement message denoted "ack, done" is provided by the appropriate OSS of the disk storage tier back to the CN. A "close" request is then sent by the CN to the MDS as indicated.

FIG. 5 shows an exemplary set of operations in which application hints are provided by an application running on the client CN leading to migration of data between storage tiers. The client CN initially sends an "open, create, fast" request to the MDS which responds with metadata that is assumed to comprise a layout of at least a portion of the flash storage tier comprising OSSs 1 and 2. The write operation is then performed by the CN interacting with one or more of the OSSs of the flash storage tier using the layout metadata provided by the MDS. Upon completion of the write operation, an acknowledgement message denoted "ack, done" is provided by the appropriate OSS of the flash storage tier back to the CN. A "close" request is then sent by the CN to the MDS as indicated.

The client CN then sends a "migrate→slow" request to the MDS. The MDS generates a migration request to the OSS Migration SW directing that certain data be migrated from the "fast" flash storage tier comprising OSSs 1 and 2 to the "slow" disk storage tier comprising OSSs 3, 4 and 5. In association with the migration request, the MDS provides metadata denoted "layout fast+slow" characterizing both the current layout in the fast tier and the new layout in the slow tier. The OSS Migration SW utilizes the metadata received from the MDS to direct the movement of the data from the fast tier to the slow tier in accordance with the new layout as indicated. This involves copying the data from the fast tier to the slow tier using a copy request denoted "cp fast→slow."

Upon completion of the data movement, an acknowledgement message denoted "ack, done" is provided by the appropriate OSS of the disk storage tier back to the OSS Migration SW, which in turn sends a "migrate complete" message to the MDS. The MDS then provides a "complete+slow layout" message back to the CN. This latter message includes the metadata characterizing the new layout of the data in the slow tier.

FIG. 6 shows another exemplary set of operations in which application hints are provided by an application running on the client CN leading to migration of data between storage tiers. The client CN initially sends an "open, create, slow" request to the MDS which responds with metadata that is assumed to comprise a layout of at least a portion of the disk storage tier comprising OSSs 3, 4 and 5. The write operation is then performed by the CN interacting with one or more of the OSSs of the disk storage tier using the layout metadata provided by the MDS. Upon completion of the write operation, an acknowledgement message denoted "ack, done" is provided by the appropriate OSS of the disk storage tier back to the CN. A "close" request is then sent by the CN to the MDS as indicated.

The client CN then sends an "open, read, fast" request to the MDS which causes the MDS to send a prefetch request to the OSS Migration SW indicating that the data should be moved from the "slow" disk storage tier comprising OSSs 3, 4 and 5 into the "fast" flash storage tier comprising OSSs 1 and 2. In association with the prefetch request, the MDS provides metadata denoted "layout slow+fast" characterizing both the current layout in the slow tier and the new layout in the fast tier. The OSS Migration SW utilizes the metadata received from the MDS to direct the movement of the data from the slow tier to the fast tier in accordance with the new layout as indicated. This involves copying the data from the slow tier to the fast tier using a copy request denoted "cp slow→fast."

Upon completion of the data movement, an acknowledgement message denoted "ack, done" is provided by the appropriate OSS of the flash storage tier back to the OSS Migration SW, which in turn sends an "ack, done" message to the MDS. The MDS then provides metadata back to the CN indicating the new layout of the data in the fast tier. The CN utilizes the metadata to execute a read operation of the fast tier and upon completion of the read operation sends a "close" request to the MDS as indicated.

It is to be appreciated that the particular operations and associated messaging illustrated in FIGS. 4, 5 and 6 are exemplary only, and numerous other types of operations and messaging may be used in other embodiments.

For example, other types of application hint information may be provided by the CN to the MDS in other embodiments and utilized by the MDS to generate data migration requests. Such application hint information in the examples of FIGS. 4, 5 and 6 is assumed to include indications such as "fast" and "slow" that are provided by the CN to the MDS in conjunction with requests such as read, write, open, create, migrate, close, etc.

The illustrative migrate and prefetch requests in the respective FIG. 5 and FIG. 6 examples are both intended to be encompassed by the more general term "data migration request" as broadly used herein.

The cluster file systems 100 and 200 or portions thereof may be implemented using one or more processing platforms each comprising a plurality of processing devices. Each such processing device may comprise processor, memory and network interface components of the type illustrated for metadata server 108 in FIG. 1.

As indicated above, cluster file system functionality such as that described in conjunction with FIGS. 1 through 6 can be implemented at least in part in the form of one or more software programs stored in memory and executed by a processor of a processing device such as a computer or server. A memory or other storage device having such program code embodied therein is an example of what is more generally referred to herein as a "computer program product." Certain system components are implemented using a combination of software and hardware.

It should again be emphasized that the above-described embodiments of the invention are presented for purposes of illustration only. Many variations and other alternative embodiments may be used. For example, the disclosed techniques are applicable to a wide variety of other types and arrangements of cluster file systems and associated clients, servers and other processing devices that can benefit from metadata server implemented storage tiering control functionality as described herein. Also, the particular configurations of system and device elements shown in FIGS. 1 through 3 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:
1. An apparatus comprising:
a metadata server of a cluster file system;
the metadata server being configured to communicate with a plurality of object storage servers of the cluster file system over a network, wherein the plurality of object storage servers comprise one or more first object storage servers in a first storage tier and one or more second object storage servers in a second storage tier, and wherein the first and second storage tiers comprise respective disjoint subsets of the plurality of object storage servers;

wherein the first object storage servers are configured to interface with object storage targets of a first type and the second object storage servers are configured to interface with object storage targets of a second type different than the first type, wherein the object storage targets of the first type comprise respective non-volatile electronic storage devices, and wherein the first and second types of object storage targets provide respective different levels of performance;

the metadata server further comprising a controller configured:

to receive application hint information via a remote procedure call interface from one or more applications running on a client of the cluster file system, wherein the application hint information indicates a desired level of performance for at least one data operation to be performed within the cluster file system;

to implement storage tiering control functionality for at least the first and second storage tiers by generating at least one data migration request based at least in part on the application hint information; and to control movement of data between at least the first and second storage tiers in response to the at least one data migration request, wherein at least a portion of data to be utilized by the at least one data operation is moved to an object storage target having a type providing the desired level of performance; and the metadata server being implemented utilizing at least one processing device comprising a processor coupled to a memory.

2. The apparatus of claim 1 wherein the non-volatile electronic storage devices comprise one or more of flash, magnetic random access memory (MRAM) and phase change random access memory (PC-RAM).

3. The apparatus of claim 1 wherein the object storage targets of the second type comprise respective disk storage devices.

4. The apparatus of claim 1 wherein the cluster file system comprises a Lustre file system.

5. The apparatus of claim 1 wherein the metadata server is further configured to communicate with a plurality of clients over the network and to process metadata requests from said clients.

6. The apparatus of claim 1 wherein the controller comprises a data placement and migration controller.

7. The apparatus of claim 1 wherein at least a portion of the controller is implemented using data migration software at least a portion of which is stored in said memory and executed by said processor.

8. The apparatus of claim 1 wherein the metadata server further comprises a policy engine, and wherein the controller of the metadata server is configured to generate at least one data migration request based at least in part on at least one policy implemented by the policy engine.

9. A processing platform comprising the apparatus of claim 1.

10. The apparatus of claim 1 wherein the metadata server is configured to send a message to the client in conjunction with the movement of the data between the first and second storage tiers, the message comprising metadata characterizing a layout of the data in at least one of the first and second storage tiers.

11. The apparatus of claim 1 wherein the at least one data operation comprises one or more of read, write, open, create, migrate and close.

12. A method comprising:

configuring a metadata server of a cluster file system to communicate with a plurality of object storage servers of the cluster file system over a network, wherein the plurality of object storage servers comprise one or more first object storage servers in a first storage tier and one or more second object storage servers in a second storage tier, wherein the first and second storage tiers comprise respective disjoint subsets of the plurality of object storage servers;

configuring the first object storage servers to interface with object storage targets of a first type and the second object storage servers to interface with object storage targets of a second type different from the first type, wherein the object storage targets of the first type comprise respective non-volatile electronic storage devices and wherein the first and second types of object storage targets provide respective different levels of performance;

receiving application hint information via a remote procedure call interface from one or more applications running on a client of the cluster file system, wherein the application hint information indicates a desired level of performance for at least one data operation to be performed within the cluster file system;

implementing storage tiering control functionality in the metadata server for at least the first and second storage tiers by generating at least one data migration request based at least in part on the application hint information; and controlling movement of data between the first and second storage tiers in response to the at least one data migration request, wherein at least a portion of data to be utilized by the at least one data operation is moved to an object storage target having a type providing the desired level of performance.

13. The method of claim 12 further comprising moving data between the first and second storage tiers under control of the metadata server.

14. The method of claim 12 further comprising:

identifying a policy to be utilized in conjunction with one or more read or write operations to be performed within the cluster file system; and generating at least one data migration request based at least in part on the identified policy.

15. A computer program product comprising a non-transitory processor-readable storage medium having encoded therein executable code of one or more software programs, wherein the one or more software programs when executed cause the metadata server to perform the steps of the method of claim 12.

16. The method of claim 12 further comprising the metadata server sending a message to the client in conjunction with the movement of the data between the first and second storage tiers, the message comprising metadata characterizing a layout of the data in at least one of the first and second storage tiers.

17. The method of claim 12 wherein the at least one data operation comprises one or more of read, write, open, create, migrate and close.

18. A cluster file system comprising:
a metadata server comprising at least one processing device, the processing device comprising a processor coupled to memory; and
a plurality of object storage servers coupled to the metadata server via a network, wherein the plurality of object storage servers comprise one or more first object storage servers in a first storage tier and one or more second object storage servers in a second storage tier, and wherein the first and second storage tiers comprise respective disjoint subsets of the plurality of object storage servers;
wherein the first object storage servers are configured to interface with object storage targets of a first type and the second object storage servers are configured to interface with object storage targets of a second type different than the first type, wherein the object storage targets of the first type comprise respective non-volatile electronic storage devices and wherein the first and second types of object storage targets provide respective different levels of performance;
the metadata server further comprising a controller configured:
  to receive application hint information via a remote procedure call interface from one or more applications running on a client of the cluster file system, wherein the application hint information indicates a desired level of performance for at least one data operation to be performed within the cluster file system;
  to implement storage tiering control functionality for at least first and second storage tiers by generating at least one data migration request based at least in part on the application hint information; and
  to control movement of data between the first and second storage in response to the at least one data migration request, wherein at least a portion of data to be utilized by the at least one data operation is moved to an object storage target having a type providing the desired level of performance.

19. The system of claim 18 wherein the cluster file system comprises a Lustre file system.

20. The system of claim 18 wherein the metadata server is configured to send a message to the client in conjunction with the movement of the data between the first and second storage tiers, the message comprising metadata characterizing a layout of the data in at least one of the first and second storage tiers.

* * * * *